United States Patent [19]

Drumheller et al.

[11] 4,338,897

[45] Jul. 13, 1982

[54] AUXILIARY PRECOMBUSTION CHAMBER AND COMBUSTION DISTRIBUTOR FOR AN INTERNAL COMBUSTION ENGINE

[76] Inventors: Dale G. Drumheller, 104 Willywood Ave., Oak Hill, W. Va. 25901; Robert M. Schell, 1719 Denstone Pl., Lemon Grove, Calif. 92045; Edward O. Drumheller, 1835 E. Main St., El Cajon, Calif. 92021

[21] Appl. No.: 175,708

[22] Filed: Aug. 6, 1980

[51] Int. Cl.³ .............................................. F02B 19/10
[52] U.S. Cl. ..................................... 123/267; 123/293
[58] Field of Search ................ 123/266, 267, 286, 293

[56] References Cited

U.S. PATENT DOCUMENTS

| | | | |
|---|---|---|---|
| 1,392,364 | 10/1921 | Smith | 123/266 |
| 1,596,240 | 8/1956 | Dikeman | 123/267 |
| 2,761,431 | 9/1956 | Nallinger | 123/293 |
| 2,777,430 | 1/1957 | Meurer | 123/25 C |
| 3,479,997 | 11/1969 | Fryer et al. | 123/267 |
| 3,905,343 | 9/1975 | Ryan | 123/267 |
| 4,041,922 | 8/1977 | Abe et al. | 123/267 |
| 4,050,422 | 9/1977 | Noguchi et al. | 123/267 |
| 4,074,664 | 2/1978 | Rollins | 123/267 |
| 4,096,832 | 6/1978 | Casoll et al. | 123/267 |

Primary Examiner—Tony M. Argenbright
Attorney, Agent, or Firm—Brown & Martin

[57] ABSTRACT

A detachable auxiliary precombustion chamber for an internal combustion engine is adapted to fit into the spark plug bore of the cylinder head and to receive a spark plug in an open bore thereof, and includes flame distributing means projecting into the combustion chamber of the engine and including a distributing cap adapted to distribute and direct flame from the precombustion chamber across the axis of the cylinder throughout the engine combustion chamber.

10 Claims, 9 Drawing Figures

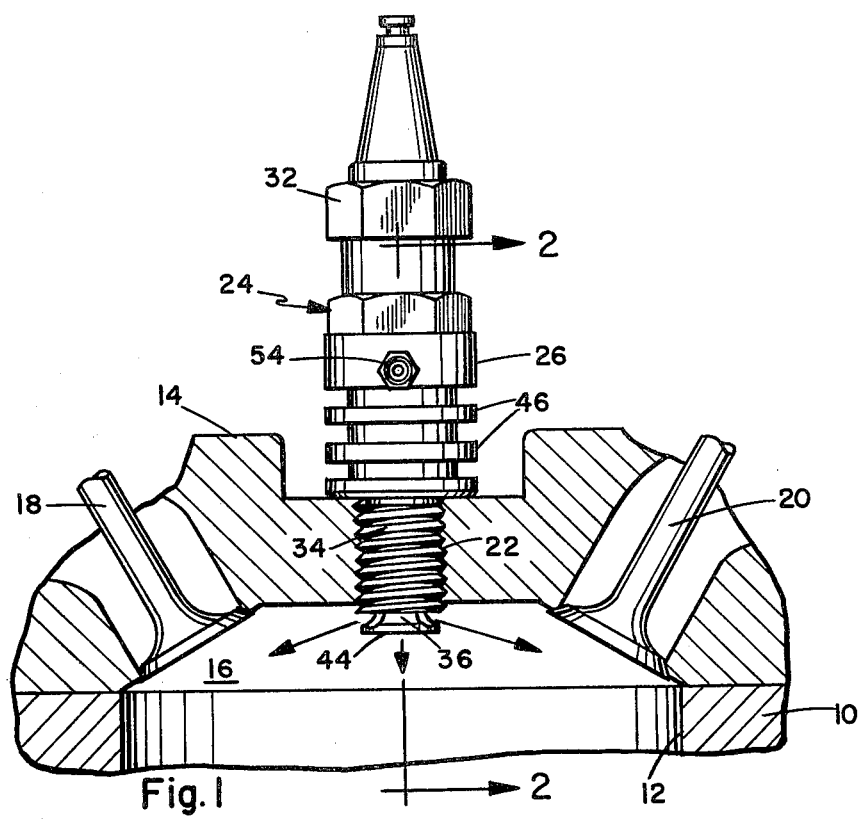
Fig. 1
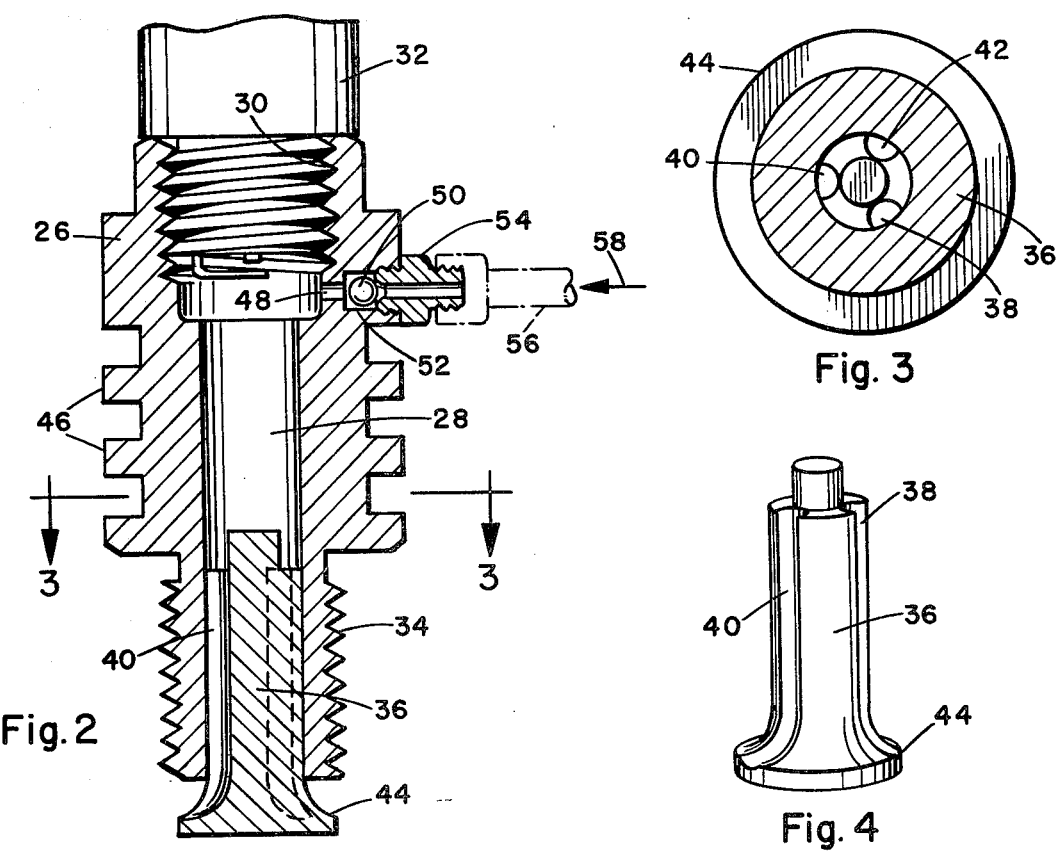
Fig. 2
Fig. 3
Fig. 4

AUXILIARY PRECOMBUSTION CHAMBER AND COMBUSTION DISTRIBUTOR FOR AN INTERNAL COMBUSTION ENGINE

BACKGROUND OF THE INVENTION

The present invention relates to internal combustion engines and pertains particularly to an improved auxiliary precombustion chamber.

Many approaches to the provision of more fuel efficient internal combustion engines have been proposed in the past. One of the primary approaches of interest has been the stratified charge engine, having a precombustion chamber with a rich mixture adapted to be preignited and to ignite a leaner mixture in the main combustion chamber. This approach has permitted an engine to run on leaner fuel mixtures which are normally incapable of being ignited by the usual engine ignition systems.

The most successful of such precombustion chambers are built into the engine as originally manufactured and include valving, etc., for supplying a rich fuel mixture to the precombustion chamber.

Numerous efforts and proposals for providing auxiliary precombustion chambers for existing engines have been proposed. These prior known devices, however, fail to recognize the necessity for controlling distribution of flame within the main combustion chamber of the engine. Many of these devices result in directing the flame from the precombustion or auxiliary combustion chamber directly onto the piston of the engine. This results in severe damage to the interior of the engine including burning of the pistons. Other approaches have failed to provide effective means for controlling the fuel in the precombustion chamber.

It is therefore desirable that an improved precombustion chamber having flame distribution control means be available.

SUMMARY AND OBJECTS OF THE INVENTION

It is therefore the object of the present invention to provide an improved precombustion chamber for an internal combustion engine, having flame distributing means for controlling the distribution of combustion flame into the main combustion chamber.

In accordance with the primary aspect of the present invention a detachable precombustion unit includes a precombustion chamber having ports for directing a flame into the main combustion chamber and including distribution means for controlling the distribution of the flame within the combustion chamber.

BRIEF DESCRIPTION OF THE DRAWINGS

The above and other objects and advantages of the present invention will become apparent from the following description when read in conjunction with the drawings wherein:

FIG. 1 is a cross-section of a typical cylinder head with a combustion distributor and spark plug installed.

FIG. 2 is an enlarged sectional view taken on line 2—2 of FIG. 1.

FIG. 3 is a sectional view taken on line 3—3 of FIG. 2.

FIG. 4 is a perspective view of a distributor plug.

DETAILED DESCRIPTION OF PREFERRED EMBODIMENTS

Figure 5:
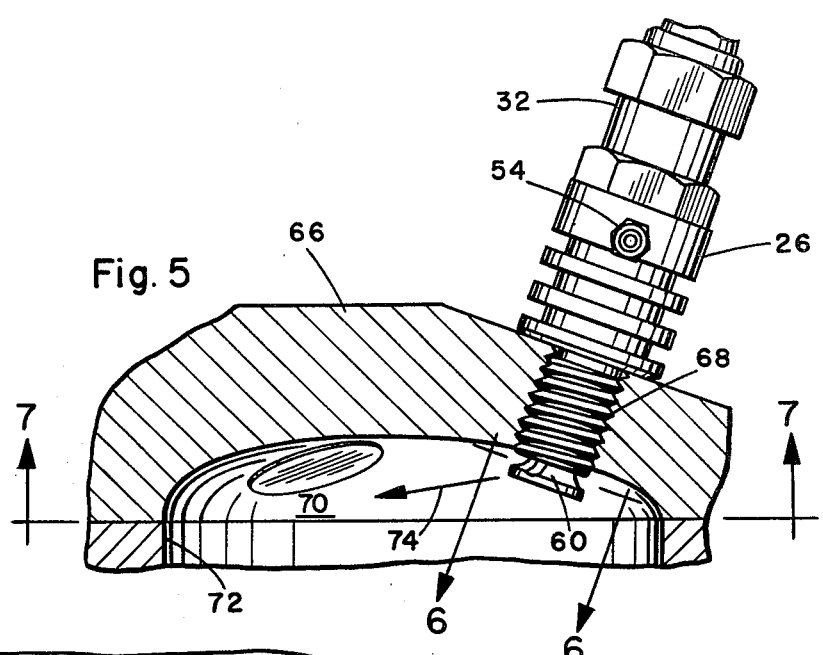
FIG. 5 is a sectional view of another cylinder head with the combustion distributor set off to one side.

Turning to FIG. 1 of the drawings a typical cylinder head of a spark ignition type internal combustion engine is illustrated. This cylinder head includes, as illustrated, a cylinder block 10 with a cylindrical bore 12, in which is reciprocably mounted a piston, not shown. A cylinder head 14 includes a substantially dome shaped combustion chamber 16 disposed directly above the cylinder 12. This combustion chamber is formed within the cylinder head 14 and is substantially symmetrical above the piston and the cylinder. This is a style typically referred to as a hemispherical head cylinder. A pair of valves 18 and 20 are positioned in intake and exhaust ports for controlling the intake and exhaust of combustion mixtures. A centrally located, threaded bore 22 is adapted to receive a spark plug for ignition of the combustion mixture within the combustion chamber.

In accordance with the invention, a precombustion chamber or auxiliary combustion chamber, designated generally by the numeral 24, includes a generally cylindrical housing 26 having a through bore 28 with an open threaded bore 30 at the upper end adapted to receive a conventional spark plug 32. Formed at the lower end of the housing 26 is a generally cylindrical threaded projection 34 adapted to fit into the spark plug bore or opening 22 of the cylinder head. The projection 34 is adapted to extend beyond the cylinder head wall into the combustion chamber 16 and includes a central core or distributor member 36 shaped and mounted within the cylindrical bore and defining flame projection and distribution ports. This insert 36 has a plurality of elongated flutes or channels 38, 40 and 42 which communicate the combustion flame to the lower end of the distributor to the flared end or tip 44, which projects below below the lower end of the bore 28 and directs the flame transversely or outward from the axis of the bore 28. The distributor member 36 is preferably press fitted within the bore 28 but may be mounted in any other suitable manner. The arrangement of the injection ports as shown in FIGS. 3 and 4 is such that the flame therefrom is directed in uniformly radial direction from the injector into the combustion chamber 16. This is an arrangement that is preferably adapted for centrally located plugs in a combustion chamber of the hemispherical or similar types. The body 36 includes radial fins 46 that preferably function to control the temperature of the combustion chamber.

In the illustrated embodiment as best seen in FIG. 2, the precombustion chamber 24 includes a fuel supply or injection port 48 that communicates at a point adjacent the lower end of the spark plug 32 for directing a fuel rich vapor into this area for ease of ignition. The injection port preferably includes a check valve which permits fuel to be drawn in on the intake stroke of the piston or cylinder and seats upon the compression stroke to prevent backfire into the fuel system. In this embodiment the port 48 has an enlarged bore 52 in which the ball 50 is seated, and a check valve seat insert 54 which also includes a connection 55 for connecting to a fuel supply line 56, for connection to a source of fuel 58. The source of fuel is preferably a vapor and may be drawn from the intake throat of the carburetor or suitable location of rich fuel vapor.

In operation of this embodiment, the spark plugs 32 is removed from the cylinder head of the engine and the precombustion chamber 24 inserted in its place, with the spark plug reinserted in the bore 30 of the chamber unit. The spark plug is reconnected into the ignition system and the precombustion chamber is connected by a fuel line 56 to a source of fuel vapor, such as the carburetor or the like. Upon cranking of the engine a rich fuel vapor is drawn into the combustion chamber or bore 30 of the precombustion chamber at the spark plug and upon ignition of this charge of fuel a flame is distributed along the flutes 42 and outward, as shown in FIG. 1, throughout the combustion chamber 16. The flutes and the flared tip 44 of the distributor distributes the flame in a uniform manner throughout the major portion of the combustion chamber. This can be effective to ignite and completely burn a much leaner mixture drawn into the cylinder head in the normal manner. Thus, once the engine has been fitted with distributor of this type the carburetor can be leaned to such an extent that the charge within the cylinder head would not normally fire with the typical ignition type spark plug or the like. Tests of the subject invention have resulted in an increase in fuel economy ranging up to approximately 33%.

Modifications can be made in the system including the elimination of the source of fuel vapor and elimination of the check valve 50 by simply providing a vent orifice which permits fuel to be forced into the chamber and bore 28 upon the compression stroke of the engine thus providing a charge within the distributor for ignition. Tests on this modification have indicated an improvement of up to about 16% increase in the fuel economy for a given engine tested.

Figure 7:
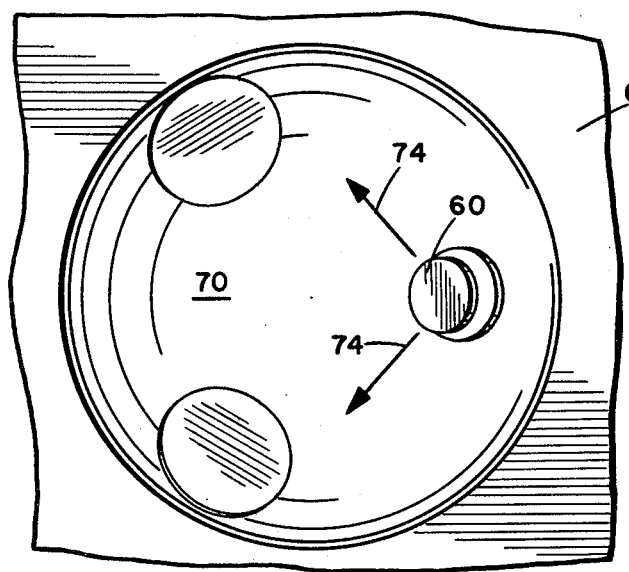
FIG. 7 is a view taken on line 7—7 of FIG. 5.
Figure 6:
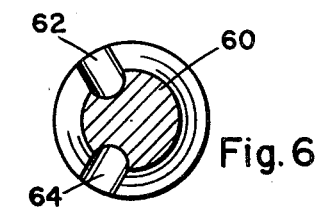
FIG. 6 is an enlarged sectional view taken on line 6—6 of FIG. 5.

Further modifications can be made in the system as illustrated in FIG. 6 such that the body 26 identical to that in the previous embodiment, is fitted with a distributor plug 60 having only a pair of flutes 62, 64 which adapts the distributor to an offset cylinder head arrangement, as shown in FIGS. 5 and 7. In this embodiment the injector is adapted to a cylinder head 66 having a spark plug bore 68 offset to one side of a combustion chamber 70 of the cylinder head. The combustion is not symmetrical to the axis of the cylinder. The distributor is offset to one side of the engine combustion chamber and is arranged to distribute the flame front from the distributor as indicated by arrow 74, toward the major area of the main combustion chamber transverse to the cylinder 72. Thus, the flared lower end of the insert 60 distributes the flame throughout the combustion chamber and prevents the flame from being directed against the piston head, but directs it into the charge in the cylinder head. The body 26 can be marked with indicia to indicate the direction of the distributor ports 62 and 64 such that these ports can be properly oriented within the combustion chamber.

Figure 8:
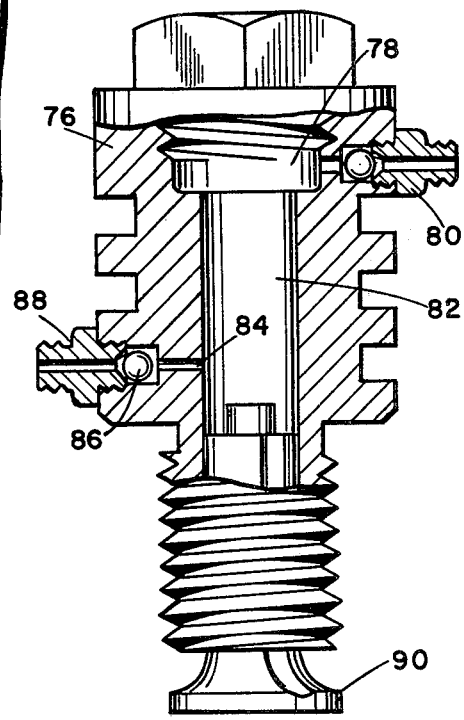
FIG. 8 is a side elevation view of a combustion distributor, with portions cut away showing a water injection inlet.

Turning to FIG. 8, an alternate modification of the system is illustrated. In this embodiment a precombustion chamber 76 is provided with the usual combustion chamber 78 with a fuel inlet and valve assembly 80 supplying fuel vapor into the combustion chamber. At the lower end of the combustion chamber the bore 82 is provided with a water or water vapor injection port 84. This port is controlled by means of a check valve 86 including a supply line connector or adaptor 88 for connecting the port to a supply of water vapor, steam or the like. This can be adapted for the injection of water into the combustion chamber subsequent to the initial ignition of the fuel rich mixture at the chamber 78. The distributor can have the usual distributing tip 90 configured to conform to or properly distribute the flame in a combustion chamber.

Figure 9:
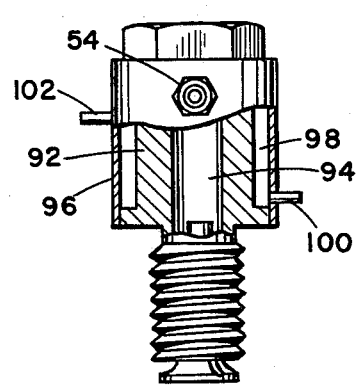
FIG. 9 is a side elevation view, partially cut away showing a water cooled jacket on the distributor.

Turning to FIG. 9, an embodiment is illustrated wherein the body 92 includes a combustion chamber or bore 94 and a surrounding water jacket 96 for cooling the injector. A supply of cooling water is circulated through the jacket space 98 by means of inlet and outlet ports or conduits 100 and 102. It is important to keep the precombustion chamber at an optimum temperature which has been found to be somewhere within the range of between 300° and 400° F.

From the above description it is seen that we have provided an improved precombustion chamber and combustion distributing system for improving the combustion and fuel economy and efficiency of internal combustion engines.

While we have illustrated and described our invention by means of specific embodiments, it is to be understood that numerous changes and modifications may be made therein without departing from the spirit and scope of the invention as defined in the appended claims.

Having described our invention, we now claim:

1. An auxiliary combustion chamber for detachable mounting on a spark ignition internal combustion engine, said chamber comprising:
   a generally cylindrical housing having a chamber therein defined by a generally cylindrical through bore, one open end of said bore communicating with said chamber and including internal threads adapted to receive a spark plug,
   a generally cylindrical projection extending from said housing and having external threads for threadably engaging the spark plug bore in the head of an engine and including a generally cylindrical central core member mounted in said bore and including a flared cap having a rim defining a flame distributor for extending beyond the bore into the combustion chamber of an engine, and
   a plurality of flame distribution ports defined by grooves in said core member and said cap and oriented for directing flame exclusively across the combustion chamber transverse to the cylinder axis.

2. The auxiliary combustion chamber of claim 1 wherein said distributor includes three ports at equal angles about the axis of said bore for mounting in a central port in a hemispherical head engine thereby directing flame from the parts throughout the combustion chamber of the engine.

3. The auxiliary combustion chamber of claim 1 wherein said distribution ports are to one side of the axis of the bore for mounting in a cylinder head having an offset plug and are thereby directed toward the main portion of the main combustion chamber of the engine.

4. The auxiliary combustion chamber of claim 1 including a fuel vapor injection port communicating with said bore adjacent the one open end thereof for communicating fuel vapor to the vicinity of the spark plug.

5. The auxiliary combustion chamber of claim 4 including a floating ball check valve in the vapor supply line for allowing vapor flow to said bore and check flow therefrom.

6. The auxiliary combustion chamber of claim 1 wherein said housing includes fins defining an air-cooled body.

7. The auxiliary combustion chamber of claim 1 wherein said housing includes a water jacket surrounding the chamber for defining a cooled body.

8. The auxiliary combustion chamber of claim 4 including a water injection port communicating with said chamber at the flame distributor end thereof.

9. The auxiliary combustion chamber of claim 4 wherein the fuel injection is directly to the end of the spark plug.

10. The auxiliary combustion chamber of claim 1 including a water vapor injection port flame distributor at the end of the combustion chamber.

* * * * *